United States Patent [19]
Cronin

[11] 4,106,013
[45] Aug. 8, 1978

[54] ELECTRIC POWER CONTROL SYSTEM WITH LOAD MANAGEMENT PROGRAMMING

[75] Inventor: Michael Joseph Cronin, Sherman Oaks, Calif.

[73] Assignee: Lockheed Aircraft Corporation, Burbank, Calif.

[21] Appl. No.: 755,656

[22] Filed: Dec. 30, 1976

[51] Int. Cl.² ............................................ G08B 21/00
[52] U.S. Cl. ................................ 340/27 R; 340/52 F; 307/43; 340/654; 340/691; 307/38
[58] Field of Search ............... 340/52 R, 52 F, 213 R, 340/248 E, 222, 251, 292, 409, 419, 27 R

[56] References Cited

U.S. PATENT DOCUMENTS 3,315,247 4/1967 Hackenberg et al. ............... 340/292
3,718,920 2/1973 Grenier ........................... 340/248 E

*Primary Examiner*—Alvin H. Waring
*Attorney, Agent, or Firm*—Ralph M. Flygare

[57] ABSTRACT

Low level control circuitry for controlling a plurality of spaced electrical load devices in an airplane is provided with parallel logic operable to provide for simultaneous manual or condition-responsive dropping of a preselected plurality of said load devices that are considered low priority. Program cards which may be in the form of printed circuit diode boards or separate programmable wiring matrices permit programming to preselect different combinations of load devices for low-priority treatment in response to different levels of emergency and or other logic signals.

9 Claims, 5 Drawing Figures

ELECTRIC POWER CONTROL SYSTEM WITH LOAD MANAGEMENT PROGRAMMING

BACKGROUND OF THE INVENTION

In electrical control systems for airplanes it is necessary to provide for selective energization of a large number of electrical controllers for controlling or positioning of electrical loads such as the landing gear, flight control surfaces, actuators, etc. These loads include elements located at various remote places throughout the airplane, as in the wings, tail, etc., and the manual control switches for the devices is generally located at the flight control station in the pilot's cabin. In the co-pending U.S. Pat. application Ser. No. 755,557, filed Dec. 30, 1976, entitled "Electric Power System Control Utilizing Low Level Signals and Miniature Gauge Wiring" filed concurrently herewith and hereby incorporated herein by reference, a system for such control is disclosed in which a direct current, low power supply buss at the flight control station is connected to each of a plurality of control circuit switches through a separate current limiting warning light (CLWL). The control switches are individually operative to impress a low level operating signal on a small gauge control conductor extending to a solid state/relay circuit or a solid state power controller (SSPC) at each load position. The low level signals may control a relatively high power relay at an SSPC to energize the corresponding load device from a high power supply buss. In an aircraft environment, the CLWL's are preferably unlighted both when the corresponding control circuit switch is inoperative and when it is operated to close a power device circuit which is in normal operating condition. However, the solid state controller includes means responsive to fault conditions to open the power circuit and also to clamp the control conductor to ground potential. Grounding of the control conductor acts through the control circuit switch to ground the associated terminal of the CLWL significantly increasing the current flow therethrough. The resulting incandescence provides the necessary warning of a circuit fault or other malfunction.

In another co-pending U.S. Pat. application, Serial No. 755,560, filed Dec. 30, 1976, entitled "Solid State Power Controller With Low Level Signal Control" filed concurrently herewith and hereby incorporated herein by reference, a control system is disclosed for aircraft loads employing solid state power controllers without requiring associated electromechanical power relays and conventional overcurrent protection. This latter system also employs low level control circuits extending between the flight control station and the controllers at the load stations, and utilizes a CLWL type control arrangement as discussed above.

In the prior control systems, as well as those described in the two aforementioned applications, disconnection of non-essential loads can be accomplished by individual isolation of the loads through opening of their control circuits or the relays. Also, it is conventional to isolate non-essential loads by means of an extra "disconnect" buss to which such loads are connected. This, of course, has the disadvantage of requiring an increase in the number of power busses required in the airplane.

It accordingly is an object of the present invention to provide a novel method and system for permitting simultaneous disconnection of a preselected group of load devices in an electrical load control system.

It is another object of the present invention to provide a novel method and system whereby a plurality of preselected non-essential loads can be dropped simultaneously without requiring the use of additional load busses and solely through action on the low level control circuit system. The disconnection may be attained by a single manual operation or automatically in response to conditions occurring in the generator or load circuit. The arrangement may include the use of a separate programmable wiring device that selects the loads to be dropped. Different wire programs may be substituted to provide different load selections. Use of parallel logic in the disconnect arrangement avoids a need for series breaks and many interlock contacts such as are normally found in the circuits of the airplane load control system.

Other objects and advantages of the present invention will become apparent from the claims and from the following description when read in connection with the attached drawings.

THE DRAWINGS

DETAILED DESCRIPTION

Figure 1:
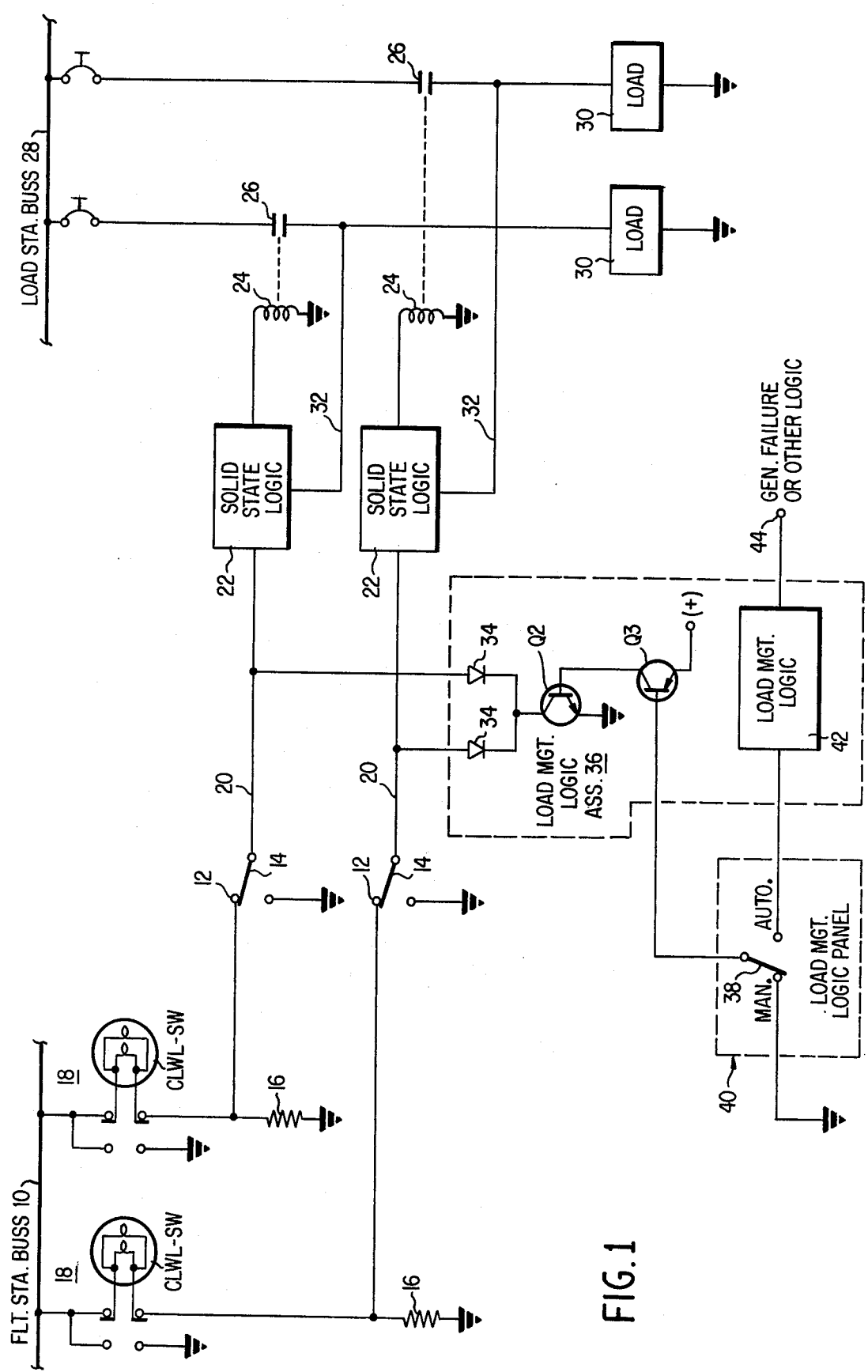
FIG. 1 is a schematic diagram of an embodiment of the electric power control system of the invention utilizing solid state logic to control power relays.

FIG. 1 illustrates a low level logic controlled system for airplane loads with programming for simultaneous disconnection of a plurality of low priority loads. The flight station in the pilot's cabin of the airplane serves as the location for ultimate control of closing and opening of load circuit conductors between the load station buss and the various loads disposed at spaced locations throughout the airplane.

A control voltage or flight station buss 10 is located at the flight station and is typically energized with 28 volts d.c. Control signal input terminals 12 of circuit control switches 14 are connected to the interconnection of a bleed resistor 16 and current limiting warning lights (CLWL's) 18 of the type described in co-pending application Ser. No. 755,558, filed Dec. 30, 1976, entitled "Dual Filament Current Limiting And Status Indicating Circuit" filed concurrently herewith and hereby incorporated herein by reference. Each CLWL 18 is biased by conventional means (not shown) into a normally closed position and can be pushed inwardly against the bias to apply a test voltage, i.e., the conventional "push-to-test" circuit.

Each of the circuit control switches 14 is connected through a low gauge conductor 20 to the input terminal of the associated controller circuit. In FIG. 1, the controller is illustrated as a solid state logic circuit which, when activated, applies power to a relay coil 24. The contacts 26 of the relay coil 24 are located in series between the load station or power buss 28 and a load 30. Closure of a control switch 14 thus imposes a low level actuating signal on the associated controller to cause closure of the associated load circuit. In open position of the switches 14, the switch 14 is preferably grounded to prevent stray currents from entering the control system. The controllers are also responsive to faults in corresponding load lines as detected by voltage feedback lines 32 to clamp their input terminals to ground potential.

With continued reference to FIG. 1, each of the solid state logic circuits 22 is connected through a diode 34 to an electronic switch such as the illustrated circuit comprising the NPN transistor Q2 and the PNP transistor Q3 at a load management logic assembly 36. The base electrode for the transistor Q3 is connected to a switch 38 on the load management logic panel 40 and its emitter is biased positively. The switch 38 is selectively positioned between a "Manual" position and an "Automatic" position. In the "Manual" position, the base electrode of the transistor Q3 is grounded. This renders Q3 conductive so that a positive bias is applied to the base electrode of transistor Q2, thereby insuring conduction of transistor Q2. In the "Automatic" position, the conduction of the transistor Q3 is controlled by the load management logic circuit 42 of the load management logic assembly. The load management logic assembly is in turn controlled by the input signals on a terminal from other conventional logic indicating generator failure.

In the event of a fault indicating signal applied to the terminal 44, the load management logic 42 will cause the conduction of the transistors Q3 and Q2 clamping the input terminals of the solid state logic circuits 22 to ground as a group. This will in turn de-energize all of the relays 24 to open all of the associated relay contacts 26 to drop all of the loads 30 as a group.

Figure 2:
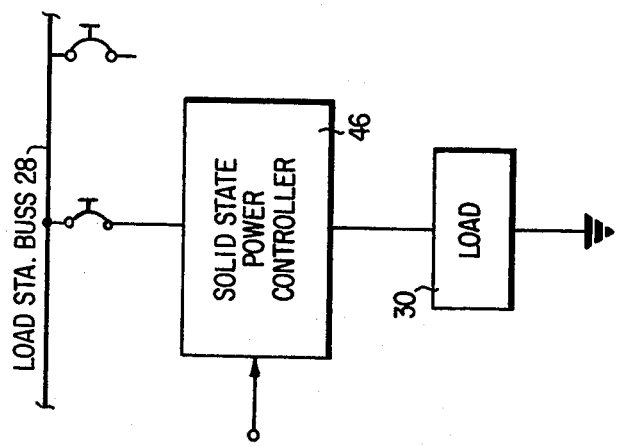
FIG. 2 is a schematic diagram of the load station portion of the system of FIG. 1 utilizing solid state power controller.

With reference to FIG. 2 where like elements have been accorded like numerical designations, the solid state logic 22 and relays 24 of FIG. 1 may be replaced by a solid state power controller 46 in the load circuit between the load station buss 28 and the load 30. The solid state power controller (SSPC) functions in the manner of the circuit of FIG. 1 as earlier described to control the application of power from the buss 28 to the load 30 in response to an indication of generator failure or a fault in the individual load circuit.

Figure 3:
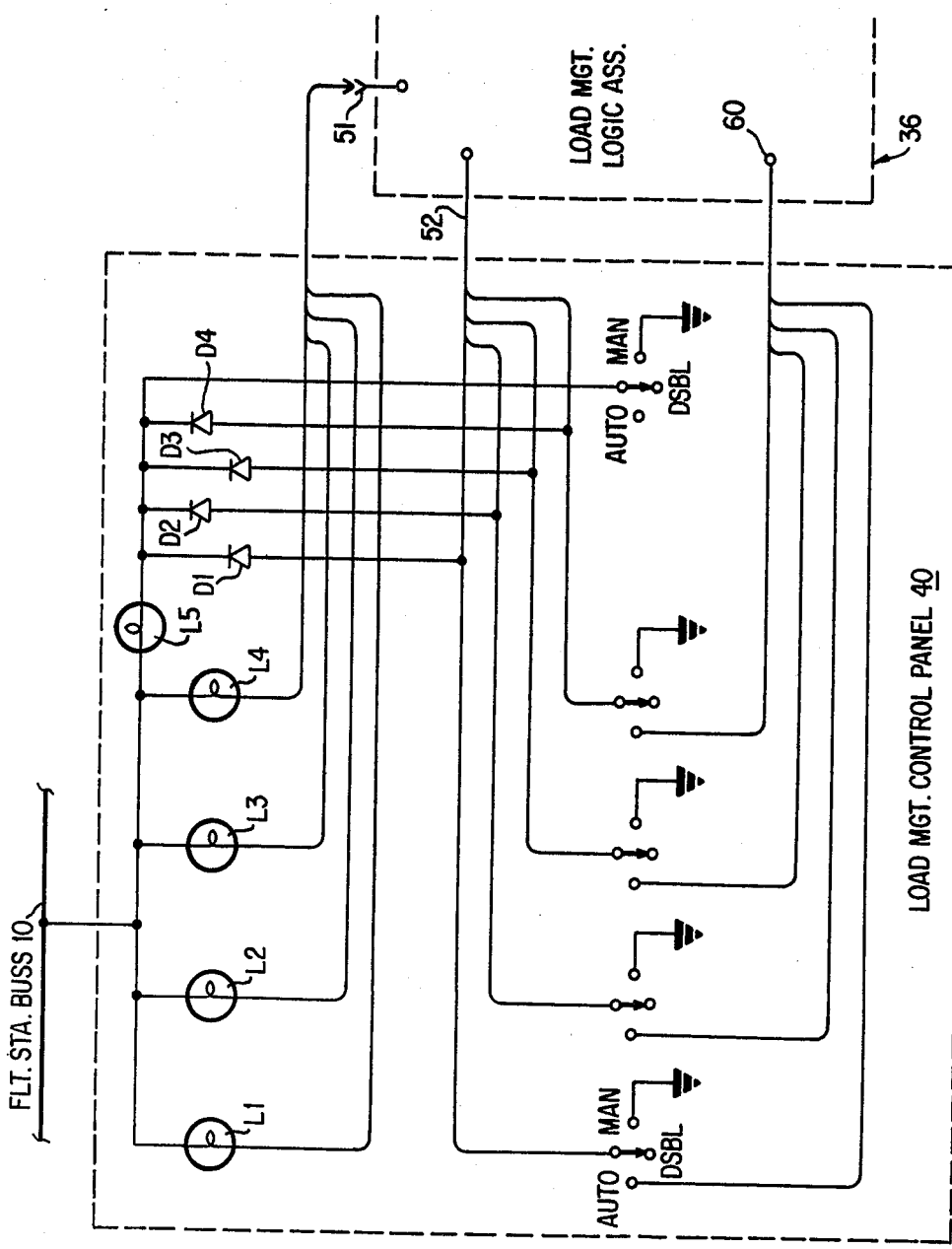
FIG. 3 is a schematic diagram of a load management control panel suitable for use in the system of FIG. 1.
Figure 4:
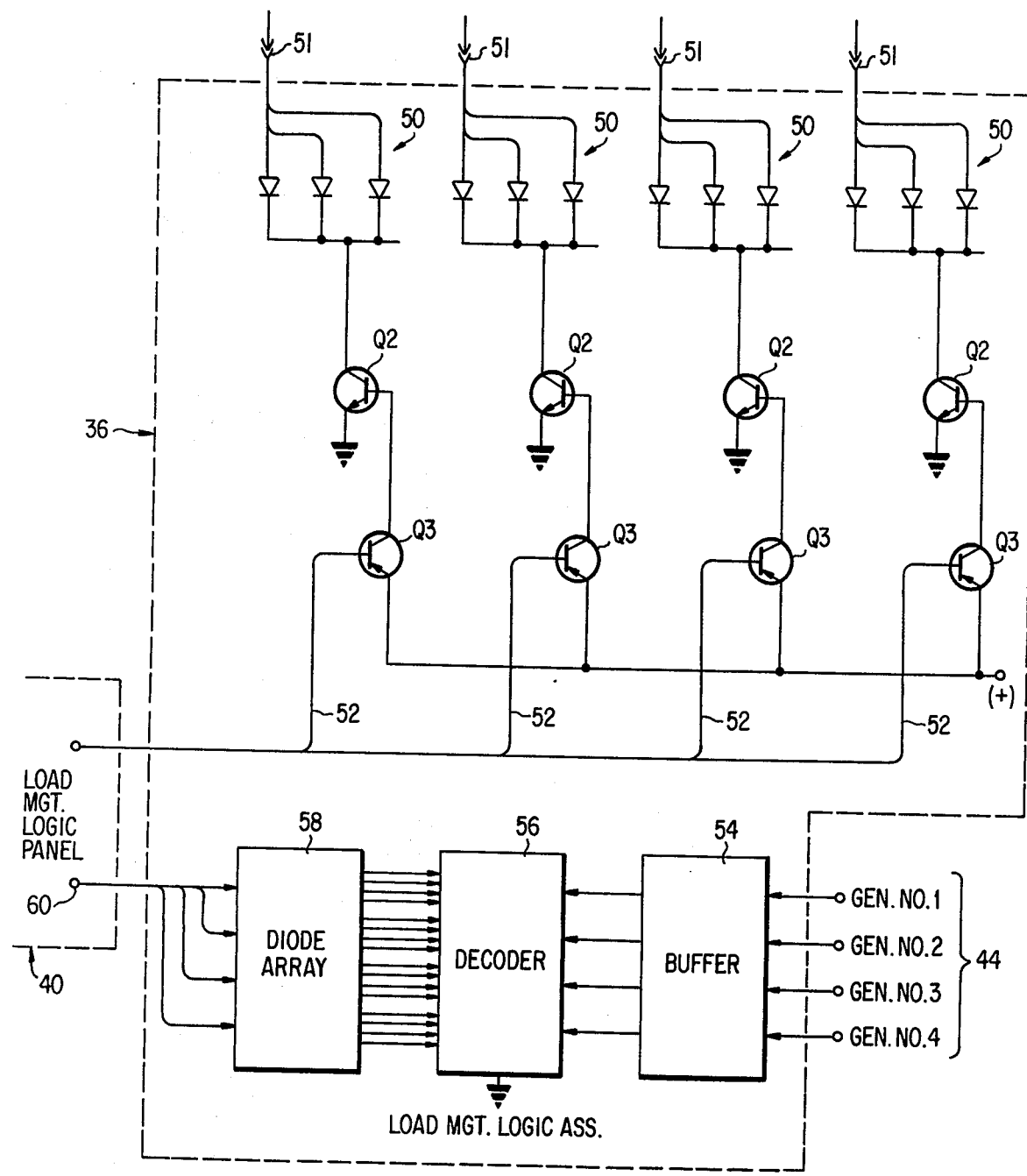
FIG. 4 is a schematic diagram of a load management logic assembly installed for use in the system of FIG. 1.
Figure 5:
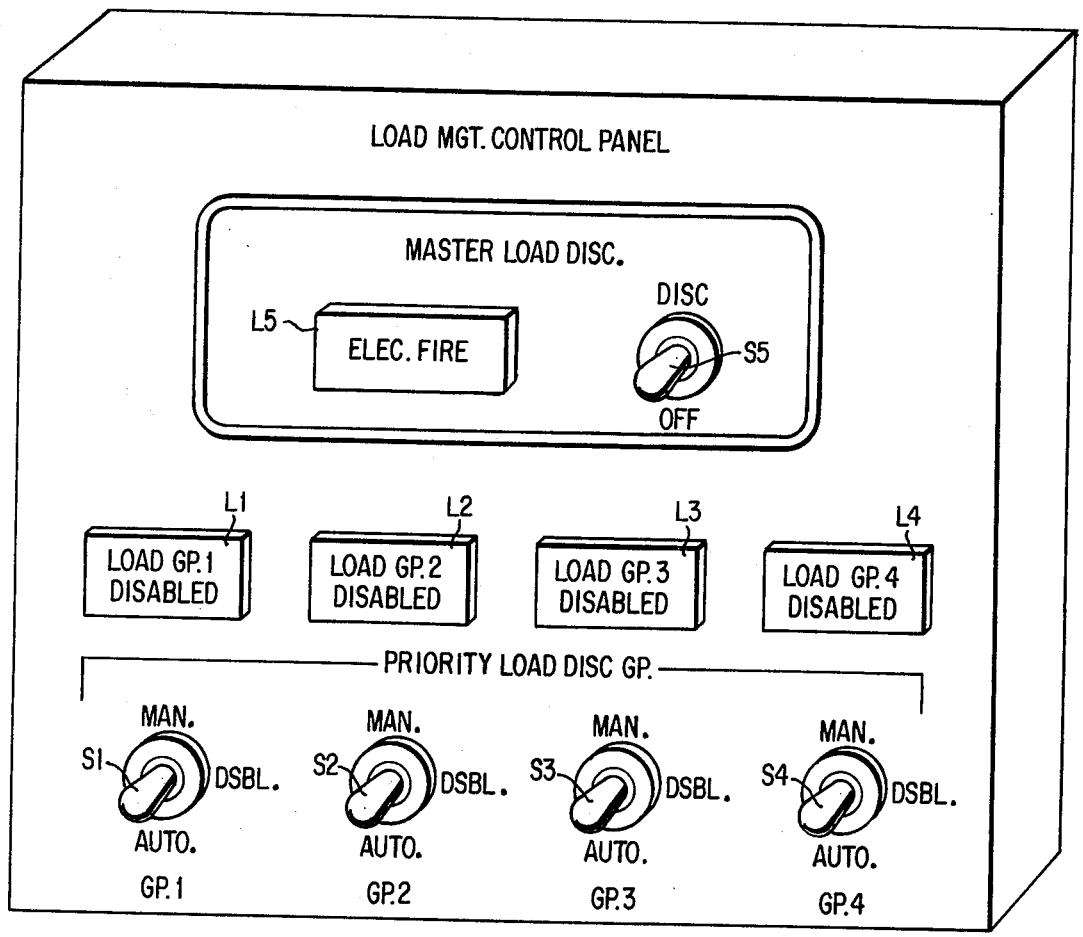
FIG. 5 is a diagram similar to FIG. 2 of a modified disconnection selector.

While the circuit of FIG. 1 illustrates the disconnection of two loads as a group, the number of loads in any group can be expanded. In addition, there can be a number of different groups where, for example, it is desirable to drop a preselected first group of loads in response to the failure of any one of four generators, to drop an additional preselected group of loads in the event of the failure of a second one of four generators, to drop an additional preselected group of loads in the event of the failure of a third one of four generators, etc. Reference may be had to FIGS. 3-5 inclusive for a system of this type.

With reference now to FIGS. 3 and 5 where a load management control panel 40 similar to that of FIG. 1 is illustrated, the panel 40 is connected to the flight station buss 10 and is desirably provided with signal lamps L1 through L5 inclusive and five switches S1 through S5 inclusive associated therewith. The manual operation of any one of the switches S1 - S4 by the pilot to the "Manual" position will ground the associated input signal to the load management logic assembly 36 and provide a current path from the flight station buss 10 through one of the associated lamps L1 - L4 to indicate the fact. The manual operation of the switch S5 to the "Manual" position will serve to ground all four of the input signals to the load-management logic assembly 36 by way of the diodes D1 - D4 inclusive associated therewith. Indicator lamp L5 will become lighted to indicate the grounding of all four of the input signals to the load-management logic assembly 36.

It should be recognized that the switches S1 - S4 do not prevent the dropping of less than all of the loads within a particular group. For example, the pilot may place switch S1 in the "Manua" position thereby dropping a group of loads and illuminating the CLWL-SW's associated with the individual circuits within the group. The pilot may then selectively operate individual switches of the control panel to open the circuits to a portion of the group of loads, and thereafter replace the switch S1 to the "Automatic" position. This selective reduction of the loads associated with a particular group or groups of loads may reduce the demand on the four generators sufficiently to obviate the cascade failure of the generators. A panel of this type is disclosed in the co-pending application Ser. No. 755,559, filed Dec. 30, 1976, entitled "a Modular Panel of Tungsten Light Switches With Current Limiting, Indicating and Switching Capability" filed concurrently herewith and hereby incoporated herein by reference.

With reference now to FIG. 4, four diode card assemblies 50 are illustrated. Each of the assemblies 50 may include, for example, 48 diodes with the anode of each diode connected to a conductor such as one of the conductors 20 of the circuit of FIG. 1 for controlling a different one of the solid state logic controllers of FIG. 1 or a solid state power controller 46 of FIG. 2. The lower end (cathode) of the diodes in each assembly 50 is connected to a common conductor in turn connected to a switching circuit such as that illustrated with NPN transistor Q2 and PNP transistor Q3, the emitter electrodes of the four transistors Q3 being connected together to a source of positive potential as schematically illustrated in the circuit of FIG. 1.

The base electrodes of each of the transistors Q3 are connected through a conductor 52 to the movable arm of the associated one of the switches S1 - S4 of the load management control panel 40 of FIGS. 3 and 5.

With continued reference to FIG. 4, the fault detection signals indicative of generator failure and applied to the terminal 44 of the load management logic 42 in the circuit of FIG. 1 may be applied to the input terminals collectively designated 44 in FIG. 4. These input signals may be applied through a buffer or signal conditioning circuit 54 for compatibility with the logic of a 4 to 16 line decoder circuit 56, e.g. a commercial Ser. No. 54154 integrated circuit. Such an arrangement is desired because, with four generators, there is a possibility of 16 different combinations of signals when taken one, two, three, and four at a time.

These decoded signals are applied to a conventional integrated circuit diode array 58 to control grounding of the four input signals from the terminals collectively designated 60 of the load management logic panel 40 of FIG. 3. The diode array 58 is, moreover, designed to insure that additional ones of the conductors from the terminal 60 are grounded in the desired sequence without any undesired interruption as additional generators fail. Thus the imposition of a failure signal from any one of the terminals 44 will ground the conductor associated with Switch S1, the imposition of a failure signal on any two of the lines from the terminal 44 will ground the conductors associated with the switches S1 and S2 of FIG. 3, the imposition of a failure signal on any three of the lines from the terminal 44 will ground the conductors associated with the switches S1, S2 and S3 of FIG. 3, etc., without any temporary release of previously grounded conductors from the ground.

A greater appreciation of the load management control panel may be gained from reference to FIG. 5 where a practical physical embodiment is illustrated. As shown in FIG. 5 the switch S5 which disconnects all of the four groups of loads may be a manually operable, lock-lever toggle switch leaving only the loads critical for the continued flight of the aircraft. Operation of the switch S5 will illuminate the lamp L5 as well as the lamps L1 - L4 inclusive indicative of the disconnecting of all four of the groups of loads.

The manual positioning of one of the three position, lock-lever toggle switches S1 - S4 in the "Manual" position will effect the dropping of the loads in that particular group, positioning of the switch into the "Automatic" position will place the loads in that particular group under the control of the load management logic, and positioning the switch into the "Disable" position will simply eliminate all of the group control in the operation of the CLWL-SW's associated with each individual load on the modular panel as described in the co-pending application Ser. No. 755,557, filed Dec. 30, 1976, earlier referenced, "Electric Power System Control Utilizing Low Level Signals and Miniature Gauge Wiring".

The present invention has been described in connection with a preferred embodiment. However, various modifications of the described forms of the invention will be evident to persons of ordinary skill in the art. It is therefore intended that the foregoing detailed description of the invention as illustrated in the drawings be considered as exemplary only and that the scope of the invention be interpreted from the following claims when accorded a full range of equivalents.

What is claimed is:

1. An electric power control system comprising:
    a source of power;
    a plurality of electrical loads;
    a controller circuit associated with each of said electrical loads and responsive to a control signal to connect the associated one of said plurality of electrical loads to said source of power;
    control means remote from said loads for selectively applying control signals to individual ones of said plurality of controller circuits; and,
    load management means operable in response to a predetermined condition to cancel the application of a control signal from said control means to a preselected plurality of said controllers as a group and thereby disconnect the corresponding electrical loads from said source of power.

2. The electric power control system of claim 1 wherein said load management means includes means responsive to different predetermined conditions to signal said control means to disconnect preselected different pluralities of said controller circuits.

3. The electric power control system of claim 2 wherein said different predetermined conditions are conditions effecting the power supplying capabilities of said source of power; and
    wherein said load management means includes logic means responsive to the power supplying capabilities of said source of power to cancel the application of a control signal to said different groups of controller circuits in a predetermined sequence.

4. The electric power control system of claim 3 wherein said load management means includes manually operable means for selectively cancelling the application of a control signal to a preselected plurality of said controller circuits as a group.

5. In an electric power control system including a plurality of loads individually connected by controllers to a source of power by the application of a control signal from a remote control station, the improvement comprising means responsive to the occurrence of any one of a plurality of conditions to cancel the application of a control signal to a first predetermined plurality of controllers as a group, said means being responsive to the occurrence of any two of the plurality of conditions to cancel the application of a control signal to a second plurality of controllers as a group, said second plurality of controllers being inclusive of said first plurality of controllers.

6. An electric power control system for an airplane containing a predetermined plurality of power generators comprising:
    a plurality of electric loads located at spaced locations in the airplane;
    power bus means energized from said plurality of generators; a controller associated with each of said loads, said controller being operable to connect the associated one of said plurality of loads to said bus means in response to the application of a control signal;
    a control panel including manually operable control means for individually applying a control signal to each of said controllers;
    means for sensing the status of each of the plurality of power generators and for providing a status signal for each of the plurality of power generators upon the existence of a predetermined condition thereof,
    first, second, third and fourth means for inhibiting respectively the application of a control signal to first, second, third and fourth groups of controllers;
    logic means responsive to said status signals for effecting the operation of said first, second, third and fourth inhibiting means in sequence as a function of the number of said plurality of status signals received but independently of the identity of the power generator represented thereby.

7. The electric power control system of claim 6 wherein said control panel includes means for indicating the status of each of the plurality of loads.

8. The electric power control system of claim 7 wherein said control panel means includes means for continuously monitoring the status of said load status indicating means.

9. The electric power control system of claim 8 wherein said means for indicating the status of the plurality of loads and said means for continuously monitoring the status of said load status indicating means together comprise two lamp filaments connected in parallel with each other and in series with a bleed resistor.

* * * * *